US009746200B2

(12) United States Patent
Holland et al.

(10) Patent No.: US 9,746,200 B2
(45) Date of Patent: Aug. 29, 2017

(54) BUILDING VENTILATOR

(71) Applicant: REDRING XPELAIR GROUP LIMITED, Peterborough Cambridgeshire (GB)

(72) Inventors: Joseph Holland, Sutton Coldfield (GB); Don Spearman, Crowborough (GB)

(73) Assignee: REDRING EXPELAIR GROUP LTD, Peterborough (GB)

(*) Notice: Subject to any disclaimer, the term of this patent is extended or adjusted under 35 U.S.C. 154(b) by 31 days.

(21) Appl. No.: 15/065,776

(22) Filed: Mar. 9, 2016

(65) Prior Publication Data
US 2016/0265804 A1    Sep. 15, 2016

(30) Foreign Application Priority Data

Mar. 13, 2015    (GB) .................................. 1504311.0

(51) Int. Cl.
*F24H 3/06*    (2006.01)
*F24F 12/00*    (2006.01)
(Continued)

(52) U.S. Cl.
CPC .............. *F24F 12/001* (2013.01); *F24F 7/08* (2013.01); *F24F 12/006* (2013.01); *F24F 13/14* (2013.01);
(Continued)

(58) Field of Classification Search
CPC .......... F24F 12/001; F24F 7/08; F24F 12/006; F24F 13/14; F24F 13/222;
(Continued)

(56) References Cited

U.S. PATENT DOCUMENTS 3,635,046 A * 1/1972 Sato ...................... F24F 5/0007
                                                        62/173
4,067,204 A * 1/1978 Riello .................... F24F 1/027
                                                        62/262
6,148,630 A * 11/2000 Saccone .................. F24F 1/027
                                                        62/259.1

FOREIGN PATENT DOCUMENTS

DE         3834440 A1    4/1990
DE         19705206 A1    8/1998
(Continued)

OTHER PUBLICATIONS

Combined Search and Examination Report dated Sep. 17, 2015, issued in British Application No. GB 1504311.0, 19 pages.

*Primary Examiner* — Davis Hwu
(74) *Attorney, Agent, or Firm* — Lewis Roca Rothgerber Christie LLP

(57) ABSTRACT

A building ventilator to provide a supply of air into a building comprises an external inlet port and a separate external outlet port and an internal inlet port and a separate internal outlet port to allow respective airstreams to flow into and out of the ventilator respectively at an exterior and at an interior of the building; a heat exchanger mounted in the flow paths between the external and internal inlet and outlet ports. The ventilator is configured to drive an airflow from the external inlet port through the heat exchanger and out of the ventilator via the internal outlet port; and to drive an airflow from the internal inlet port through the heat exchanger and out of the ventilator via the external outlet port. The ventilator comprises a heating element mounted in the air flow path between the external inlet port and the heat exchanger.

18 Claims, 7 Drawing Sheets

(51) Int. Cl.
    *F24F 13/22*     (2006.01)
    *F24F 7/08*     (2006.01)
    *F24F 13/14*     (2006.01)
    *F24F 13/30*     (2006.01)
    *F25D 21/06*     (2006.01)
    *F24F 11/00*     (2006.01)

(52) U.S. Cl.
    CPC ............ *F24F 13/222* (2013.01); *F24F 13/30* (2013.01); *F25D 21/06* (2013.01); *F24F 2011/0087* (2013.01); *F24F 2013/1433* (2013.01); *F24F 2013/227* (2013.01); *Y02B 30/563* (2013.01)

(58) Field of Classification Search
    CPC ....... F24F 2011/0087; F24F 2013/1433; F24F 11/0076; F24F 11/0012; F24F 1/0014; F25D 21/06
    USPC ........................................................ 165/122
    See application file for complete search history.

(56) References Cited

FOREIGN PATENT DOCUMENTS

| | | |
|---|---|---|
| DE | 10255172 A1 | 6/2004 |
| DE | 102005016913 A1 | 10/2006 |
| DE | 102006001724 A1 | 7/2007 |
| DE | 102009032047 A1 | 1/2011 |
| EP | 1488175 B1 | 6/2006 |
| JP | 2005-282927 A | 10/2005 |
| JP | 2006-132884 A | 5/2006 |
| KR | 10-0974085 B1 | 8/2010 |
| WO | WO 03/076851 A1 | 9/2003 |
| WO | WO 2006/006827 A1 | 1/2006 |

\* cited by examiner

BUILDING VENTILATOR

CROSS-REFERENCE TO RELATED APPLICATION(S)

This application claims the priority benefit of British Patent Application No 1504311.0 filed Mar. 13, 2015 in the United Kingdom, the entire content of which is incorporated herein by reference.

FIELD OF INVENTION

The present invention relates to a building ventilator configured to transfer heat energy between a flow of air exhausted from an interior of a building and a flow of fresh air supplied into the interior of the building.

BACKGROUND ART

Most modern buildings require a ventilator system to provide a supply of fresh air into the building interior. In addition, most ventilation systems act to regulate the internal temperature of the building where occupants, equipment and solar heat increase the building's internal temperature which if unregulated becomes uncomfortable and can be harmful to electronics equipment for example.

Most territories have regulations that establish minimum fresh air requirements for the building interior depending upon intended usage and occupancy levels. Typically, most commercial buildings utilise electricity driven air conditioning systems that both circulate air within the building and provide internal air temperature control.

In response to climate change and in particular global warming, international legislation has imposed emission limitations and energy efficiency requirements. Accordingly, certain territories have introduced regulations on the energy performance of buildings which in some counties manifests as an annual carbon emission rating. This increased awareness of the carbon footprint of buildings, has led to the re-examination of the energy performance and suitability of all systems associated with the building that consume energy. Various ventilation devices have been proposed to increase the thermal efficiency of building ventilation. In particular, WO 2006/006827 discloses a heat recovery ventilation device which transfers heat between air exhausted from a room (during ventilation) and fresh inlet air to provide a supply of a heated fresh air. Other ventilators and ventilation systems directed to improving the thermal efficiency of a building are described in KR 10-0974085; DE 10 2005016913; DE 10 2006001724; JP 2005-282927; JP 2006-132884. However there exists a need for a building ventilator that improves the efficiency by which energy may be transferred during the ventilation and supply of fresh air at a building interior.

SUMMARY OF THE INVENTION

It is an objective of the present invention to provide a ventilator for a building that maximises the efficiency of thermal energy transfer between a flow of air into the building and a flow of air out of the building. It is a further specific objective to provide a ventilator configured to provide moisture management of the air that is exhausted from the building interior to firstly prevent the moisture from being reintroduced into the building interior if desired and to protect the internal components of the ventilator from water damage in addition to providing a mechanism for removing condensation within the ventilator during normal use.

It is a further specific objective to provide a ventilator that is compact in construction and therefore enables convenient installation at a building and in particular an external building wall or external region of a building to provide a conduit for the flow of fresh air from an external region of the building and the exhaust of warm, stale and/or humid air from within the building interior.

The objectives are achieved by the present ventilator configured to independently drive two counter-air flow streams (including a first fresh air stream from the external side of the building and a second air flow stream form the building interior) through a single heat exchanger/recuperator mounted internally within the device. Advantageously the building ventilator of the present invention has first and second impellers configured to independently drive two counter-air flow streams (including a first fresh air stream from the external side of the building and a second air flow stream form the building interior) through a single heat exchanger/recuperator mounted internally within the device. Advantageously, one impeller is positioned in the air flow stream between the heat exchanger and an air flow outlet port provided at an external region of the building to optimise the exhaust flow of air from the building interior via the ventilator. The air flow characteristics of the exhaust air flow through the ventilator are accordingly optimised to maximise heat recovery and in particular the transfer of heat energy to the fresh air flow stream. Positioning one of the impellers in the air flow path immediately downstream of the heat exchanger and immediately upstream of the external outlet port (with respect to the flow of extracted air) is beneficial to draw into the ventilator the stale air from within the building interior and then to drive this air (after it has transferred its thermal energy to the counter flow fresh air flow stream) out of the ventilator where it is exhausted to the environment.

This relative positioning of the impeller at the exhaust air flow outlet is also advantageous to control and manage moisture/condensation within the ventilator and in particular the building interior. The impeller location within the ventilator relative to the heat exchanger and the exhaust outlet port is effective to entrain condensation or moisture within the ventilator exhaust air flow stream and to eject, and in particular force, the condensation directly from the exhaust outlet port in the form of vapour, water droplets, mist etc. The present device is also further advantageous by including one or more liquid collection reservoirs, directing channels (or fluid conduits) such that condensation within the ventilator at various internal regions is collected and transferred to the exhaust impeller and efficiently ejected directly through the exhaust outlet port at the external region of the building.

According to a first aspect of the present invention there is provided a building ventilator to provide a supply of air into an interior of a building comprising: a housing mountable at the building; an external inlet port and a separate external outlet port provided at the housing to allow a stream of air to flow into and out of the ventilator respectively at an exterior of the building relative to an interior of the building; an internal inlet port and a separate internal outlet port provided at the housing to allow a stream of air to flow into and out of the ventilator respectively at the interior of the building; a heat exchanger mounted in the housing in the flow path between the external and internal inlet and outlet ports; the building ventilator configured to drive a flow of air from the external inlet port through the heat exchanger and out of the ventilator via the internal outlet port; and to drive a flow of air from the internal inlet port through the heat exchanger and out of the ventilator via the external outlet port; wherein the second impeller is positioned in the air flow path between the heat exchanger and the external outlet port; wherein the ventilator further comprises a heating element mounted in the air flow path between the external inlet port and the heat exchanger.

Preferably the ventilator comprises a first impeller to drive the flow of air from the external inlet port through the heat exchanger and out of the ventilator via the internal outlet port; and a second impeller to drive the flow of air from the internal inlet port through the heat exchanger and out of the ventilator via the external outlet port; wherein the second impeller is positioned in the air flow path between the heat exchanger and the external outlet port.

Preferably, the second impeller is mounted adjacent the heat exchanger and the external outlet port. In particular, the impeller is positioned immediately below a region of the heat exchanger from which the stale air emerges. Accordingly, condensate is capable of falling under gravity to drip into the impeller and also onto a condensation reservoir or well that surrounds an upper region of the second impeller. Preferably, the impeller is positioned in the same horizontal plane as the external outlet port and is positioned a short distance from the external outlet port. In particular, the impeller is separated in the horizontal plane from the external outlet port by a distance which is less than a diameter and preferably a radius of the impeller (that may comprises a generally cylindrical configuration). Preferably, the impeller is separated in a horizontal plane from the external outlet port by a distance that is approximately equal to a diameter of the external outlet port. Preferably, the second impeller is separated from the heat exchange in a vertical plane by a distance that is less than an axial length of the impeller being relative to an axle about which the impeller is configured to rotate.

Preferably, the ventilator further comprises a condensation trap positioned adjacent the heat exchanger to collect condensation formed at the heat exchanger. Preferably, the condensation trap is positioned immediately below the heat exchanger when the ventilator is installed and operating in normal use. Preferably, the condensation trap comprises a length and width in which the length of the trap is orientated to extend between the external and the internal inlet and outlet ports (and the external and internal cover plates). Preferably, the condensation trap is inclined in a lengthwise direction such that one of the condensation trap positioned closest to the internal inlet and outlet ports is raised in a vertical plane relative to a second lengthwise of the condensation trap positioned closest to the external inlet and outlet ports and in particular the second impeller. Accordingly condensate is configured to flow under gravity down the condensation trap towards the second lengthwise of the trap at which is mounted the second exhaust impeller. Optionally, the condensation trap is substantially rectangular.

Preferably, the condensation trap comprises a well provided at or below a region of the heat exchanger in air flow communication with the external inlet and/or outlet port to guide condensation into the second impeller and allow the condensation to be ejected from the ventilator via the external outlet port. Preferably, the well is positioned to surround an upper region of the impeller (in a vertical direction) such that condensate is configured to flow under gravity into the well and then to fall into the impeller in contact with the impeller blades. The impeller is also configured to draw-in condensate that is entrained in the exhaust air flow stream flowing through the ventilator.

Preferably, the condensation trap comprises a trough provided at or below a region of the heat exchanger in air flow communication with the internal inlet and/or outlet port to collect condensation formed at the heat exchanger, preferably formed in one half of the heat exchanger closest to the building interior. The trough is preferably configured to direct the condensation to the second impeller. Preferably, the trough is positioned at one lengthwise of the condensation trap and extends widthwise across the trap immediately below one region of the heat exchanger positioned closest to the internal inlet and outlet ports. Preferably, the trough comprises an overflow channel extending lengthwise along the trap and provided in fluid communication with the well that surrounds the upper region of the exhaust impeller.

Preferably, the trough is provided in fluid communication with the well via a U-bend tube. Such an arrangement is advantageous to provide and maintain the partitioning of the internal regions of the cavity that mounts the heat exchanger and in particular the zones of the internal cavity in communication with the external inlet and outlet ports and the zones of the cavity in communication with the internal inlet and outlet ports.

Preferably, the ventilator comprises a first motor assembly to drive the first impeller and a second motor assembly being independent of the first motor assembly to drive the second impeller. Preferably, at least a part or parts of the second motor assembly comprise a condensation protective coating to prevent condensation impregnating the part or parts of the motor assembly. Optionally, the first impeller is mounted between the external inlet port and the heat exchanger.

Preferably, the heating element is a resistance heating element such as a hot wire or filament based component. A PCB or suitable electronic components are coupled to the heating element to enable local or remote control via wired or wireless communications. Preferably, the heating element is mounted in the air flow path between the external inlet port and the first impeller.

Preferably, the ventilator further comprises a first shutter movably mounted to open and close the external inlet port and a second shutter movably mounted to open and close the external outlet port. Such an arrangement is advantageous to open and close the internal and external ports independently depending upon the mode of operation of the ventilator. Preferably, the ventilator comprises a first and second shutter motor to independently actuate the respective first and second shutters.

Optionally, a part of the housing comprises an outer cover removably mounted at the ventilator via at least one releasable fastening.

Preferably, the ventilator further comprises a control unit having a user interface to provide electronic control of the first and second impellers. Preferably, the ventilator further comprises control communication components to provide wired or wireless communication between the ventilator and a control unit and/or a network of building ventilator devices.

According to a second aspect of the present invention there is provided a building ventilator to provide a supply of air into an interior of a building comprising: a housing mountable at the building; an external inlet port and a separate external outlet port provided at the housing to allow a stream of air to flow into and out of the ventilator respectively at an exterior of the building relative to an interior of the building; an internal inlet port and a separate internal outlet port provided at the housing to allow a stream of air to flow into and out of the ventilator respectively at the interior of the building; a heat exchanger mounted in the housing in the flow paths between the external and internal inlet and outlet ports; a first impeller to drive a flow of air from the external inlet port through the heat exchanger and out of the ventilator via the internal outlet port; and a second impeller to drive a flow of air from the internal inlet port through the heat exchanger and out of the ventilator via the external outlet port; wherein the second impeller is positioned in the air flow path between the heat exchanger and the external outlet port; wherein the building ventilator further comprises a condensation trap positioned adjacent the heat exchanger to collect condensation formed at the heat exchanger; the condensation trap comprising a well provided at a region of the heat exchanger in air flow communication with the external inlet and/or outlet port to guide condensation into the second impeller and allow the condensation to be ejected from the ventilator via the external outlet port; the condensation trap further comprising a trough provided at a region of the heat exchanger in air flow communication with the internal inlet and/or outlet port to collect condensation formed at the heat exchanger, the trough configured to direct the condensation to the well; the trough being provided in fluid communication with the well via a U-bend tube.

According to a third aspect of the present invention there is provided a building comprising a ventilator as claimed herein.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
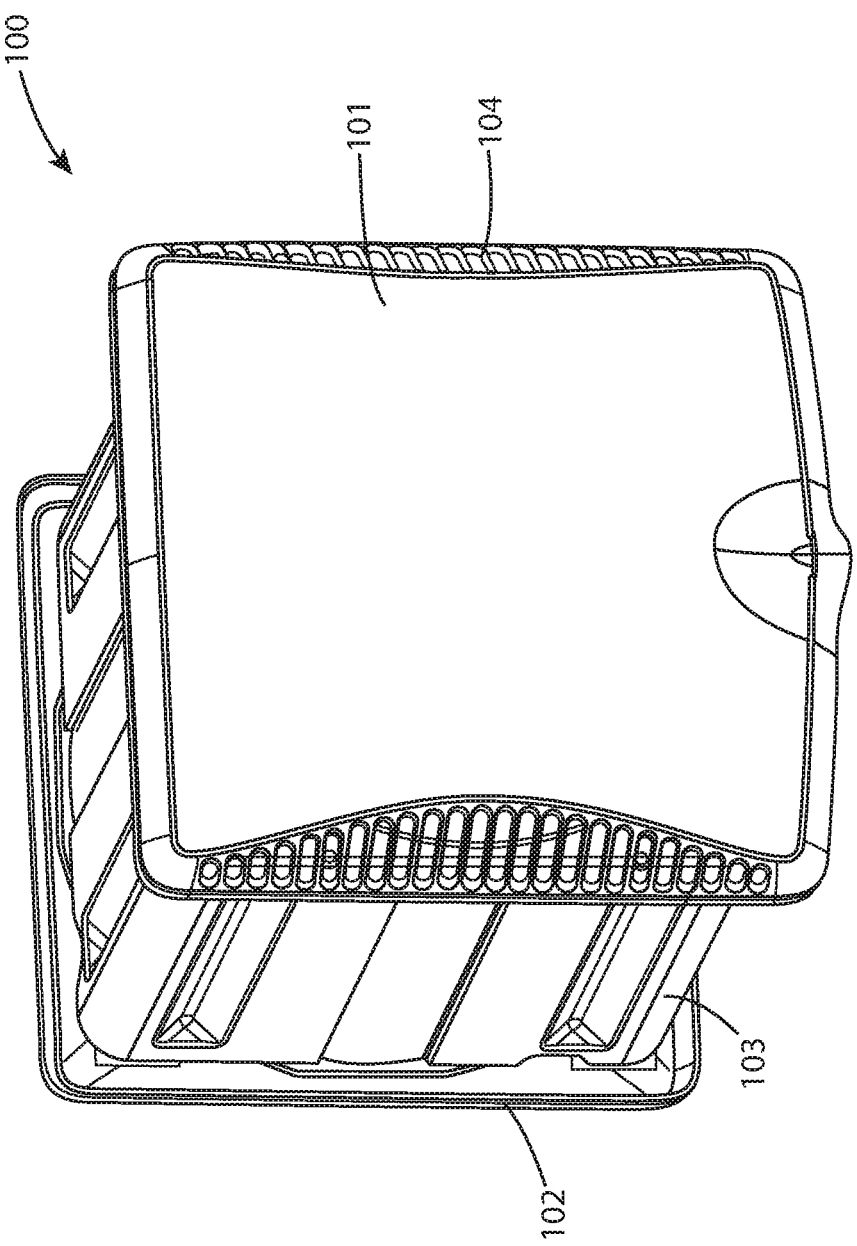
FIG. 1 is an external perspective view of a building ventilator mountable at an external wall of a building according to a specific implementation of the present invention.
Figure 2:
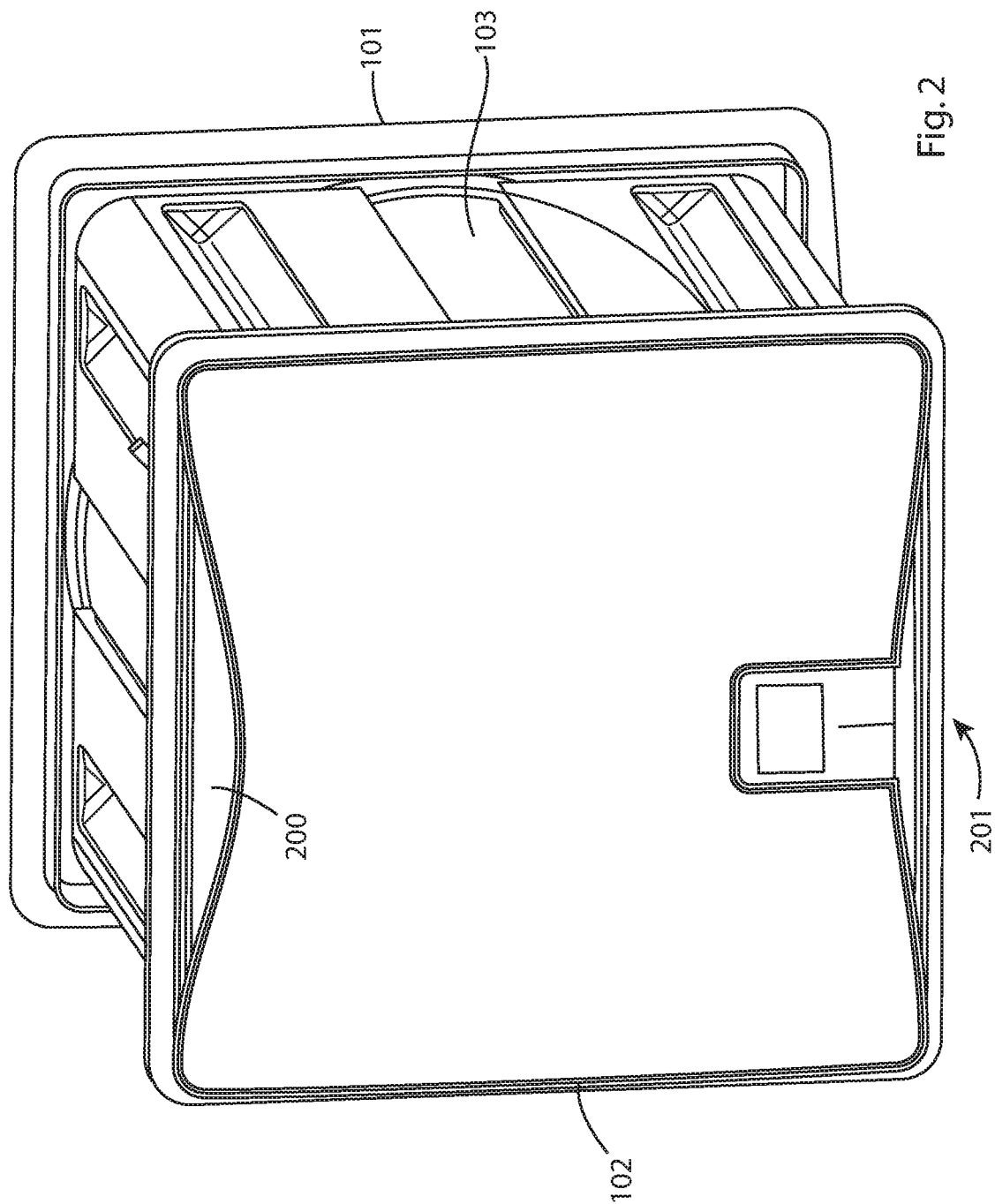
FIG. 2 is a further perspective view from the reverse side of the ventilator of FIG. 1.

Referring to FIGS. 1 and 2, a building ventilator 100 comprises an external cover plate 101 for positioning at an external region of a building and an internal cover plate 102 for mounting at the building interior. A main body 103 extends between the external and internal plates 101, 102 such that body 103 and plates 101, 102 collectively define a housing mountable at an aperture in a building wall. Ventilator 100 is configured to allow a first air flow stream to flow from an external region of the building to the building interior in addition to a second counter air flow stream from the building interior to the building exterior. External plate 101 comprises a plurality of vent apertures 104 to allow the supply flow of air from the building external environment into the ventilator 100 and the building interior in addition to providing the exhaust of the extraction flow of air from the building interior to exterior. Cover plate 101 is removably secured to main body 103 via one or more releasable fixings (such as screws, clips or the like, not shown).

A corresponding inlet port 200 and outlet port 201 are provided at the region of internal cover plate 102 to allow air within the building interior to be drawn into the ventilator 100 and to allow the exit of the supply flow from the ventilator 100 into the building interior, respectively.

Figure 3:
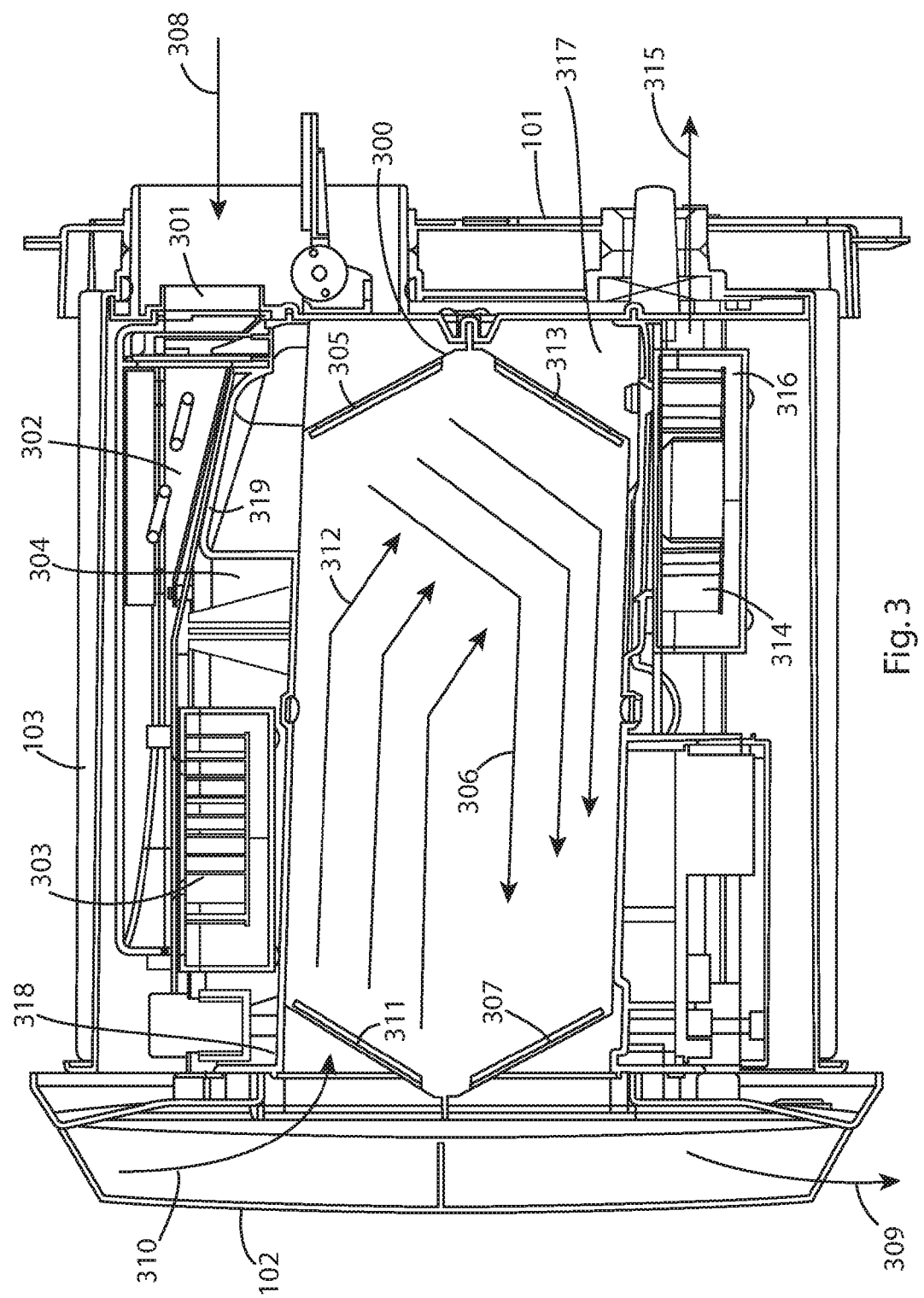
FIG. 3 is a side cross sectional view through the ventilator of FIG. 2.
Figure 4:
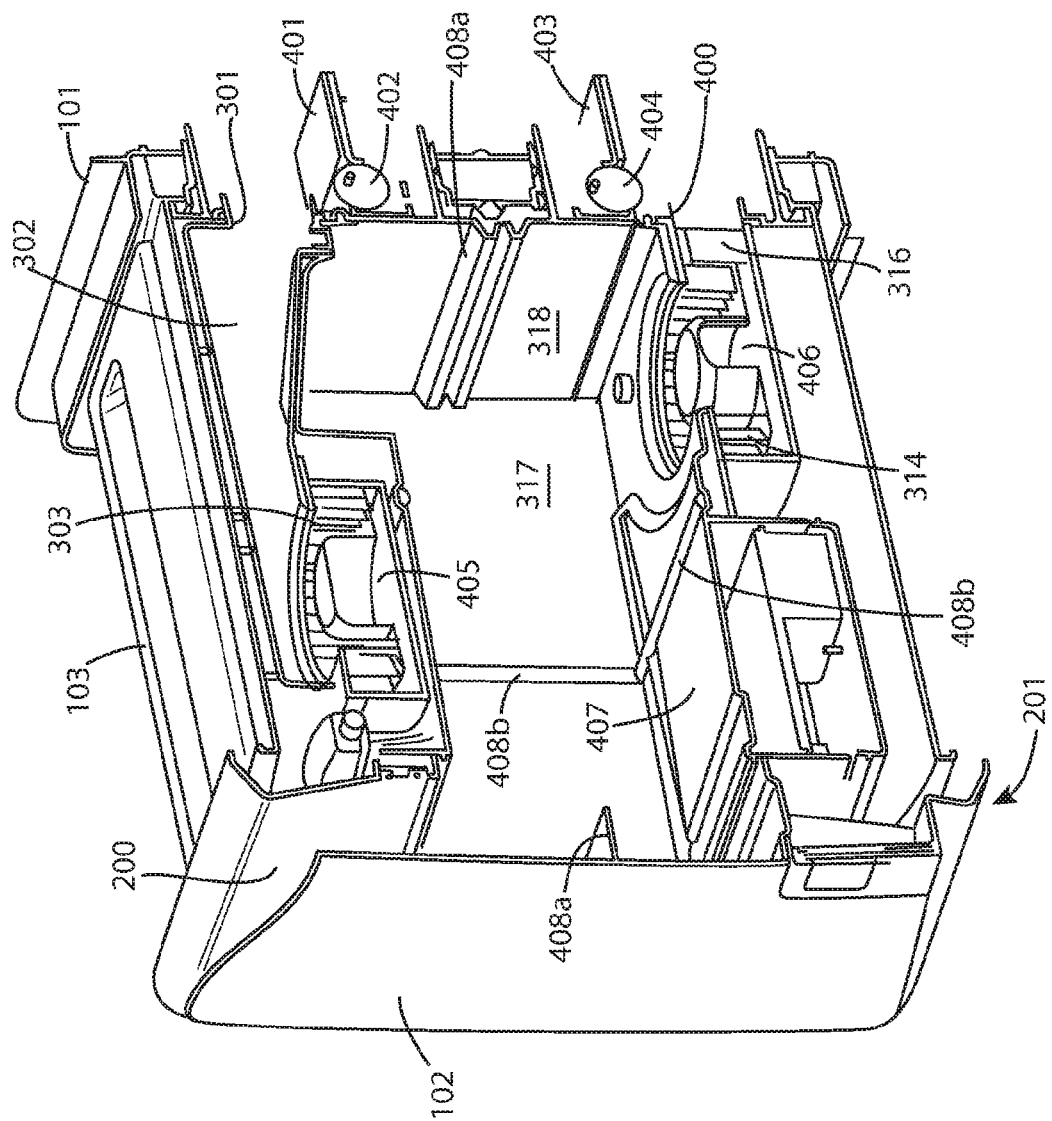
FIG. 4 is a side cross sectional perspective view of the ventilator of FIG. 3.

Referring to FIGS. 3 and 4, the ventilator housing 101, 102, 103 provides a casing for a plurality of internal components including in particular a heat exchanger (recuperator) 300; a first and second impeller 303, 314; a network of air flow ducting (internal passageways) 302, 316; a plurality of air flow seals/partitions 408a, 408b; a condensation trap 407; a plurality of inlet and outlet port shutter flaps 401, 403; impeller motors (not shown) and shutter motors 402, 404; and other electronic components (not shown) such as PCBs, wiring, wired or wireless communication modules as will be appreciated and common to electronically controlled ventilation devices.

Heat exchanger 300 is mounted within an internal cavity 317 at least partially defined by a series of internal cavity walls 318 extending within main body 103. Heat exchanger 300 is configured as a recuperator for the efficient transfer and reuse of thermal energy between the two counter-air flow streams (supply air flow stream and stale air flow stream) at a different respective temperatures. Heat exchanger 300 comprises a plurality of internal ducts, formed by a plurality of stacked planar fins (formed as thin plates), through which the supply flow of air may travel in a first direction and being partitioned and physically separated from the counter flow of air around the ducts passing in the opposite direction. In particular the recuperator 300 comprises internal ducts that allow the extracted flow to be surrounded by three separate streams of supply air to maximise the thermal transfer when for example the ventilator 100 is operating in a 'heat recovery' mode such that the heat from the extraction flow is transferred to the supply flow which is then delivered to the building interior via outlet port 201. The recuperator 300 comprises a series of air flow inlet and outlet faces including in particular inlet faces 305, 311 and outlet faces 313, 307 with these faces configured to allow the through passage of air within the recuperator 300 between the internal plates and within the internal ducts.

Main body 103 and internal walls 318 define an external inlet port 301 and an external outlet port 400 located inboard and behind external cover plate 101. A supply passageway 302 extends internally from inlet port 301 in fluid communication with first impeller 303 that is driven by a suitable motor and electronic components (not shown) mounted at a cavity 405 immediately below impeller 303 within passageway 302. A second region 304 of supply passageway 302 extends between impeller 303 and cavity 317 (that mounts heat exchanger 300) and is provided in fluid communication with cavity 317 via an aperture 319. Main body 103 and wall 318 also define an extraction passageway 316 in which the second impeller 314 is mounted immediately below heat exchanger 300. Extraction passageway 316 is provided in direct fluid communication with external outlet port 400. Like the first (supply flow) impeller 303, a motor and suitable electronics (not shown) are mounted at cavity 406 immediately below the second (extraction) impeller 314 within extraction passageway 316.

A first and second pivotally mounted shutter flap 401, 403 are located internally behind cover plate 101 and are actuated to pivot through approximately 90° via respective drive motors 402, 404. Each respective shutter flap 401, 403 is configured to contact and close each of the respective external inlet and outlet ports 301, 400 so as to prevent air flowing into and from ventilator 100 at the external side of the building.

Figure 5:
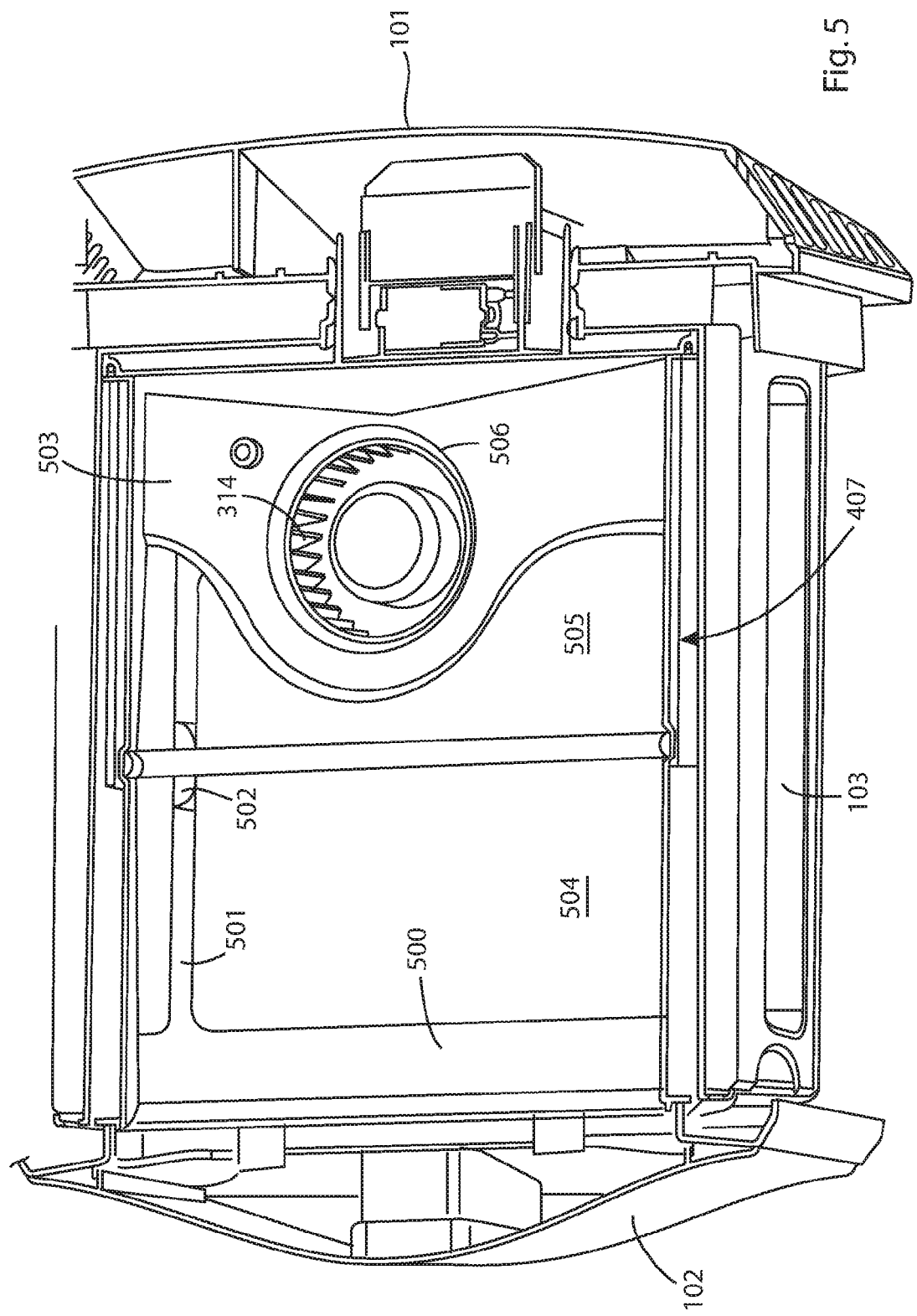
FIG. 5 is a plan cross sectional view of the ventilator of FIG. 2.

Internal cavity 317 is also defined, in part, by a condensation trap 407 formed as a contoured plate positioned to define a lower or bottom region of cavity 317. Trap 407 comprises a first half 504 positioned directly below faces 311, 307 of heat exchanger 300 so as to be located closer to the building interior and internal inlet and outlet ports 200, 201 relative to a second half 505 of trap 407. The second half 505 of trap 407 is positioned directly below heat exchanger faces 305, 313 being closer to the external ports 301, 400 and the external region of ventilator 100 referring to FIG. 5. Trap 407 is configured to collect condensation generated at heat exchanger 300 and to direct the condensation for exhaust from ventilator 100. Trap first half 504 comprises a recessed trough 500 extending generally widthways or laterally across trap 407. A corresponding recessed well 503 is provided in trap second half 505 with a channel 501 providing a liquid communication pathway from trough 500 to well 503. Trap 407 is mounted so as to be inclined at an angle of between 1 to 5° such that condensation collected in trough 500 is configured to flow under gravity through channel 501 and into well 503. A sink 506 is formed within well 503 and is shaped and configured to provide a mounting in fluid communication with second impeller 314 that is positioned immediately below trap 407 at the region of sink 506. Accordingly, liquid condensation is transferred from trough 500, through channel 501, into well 503, sink 506 and ultimately into impeller 314.

Figure 6:
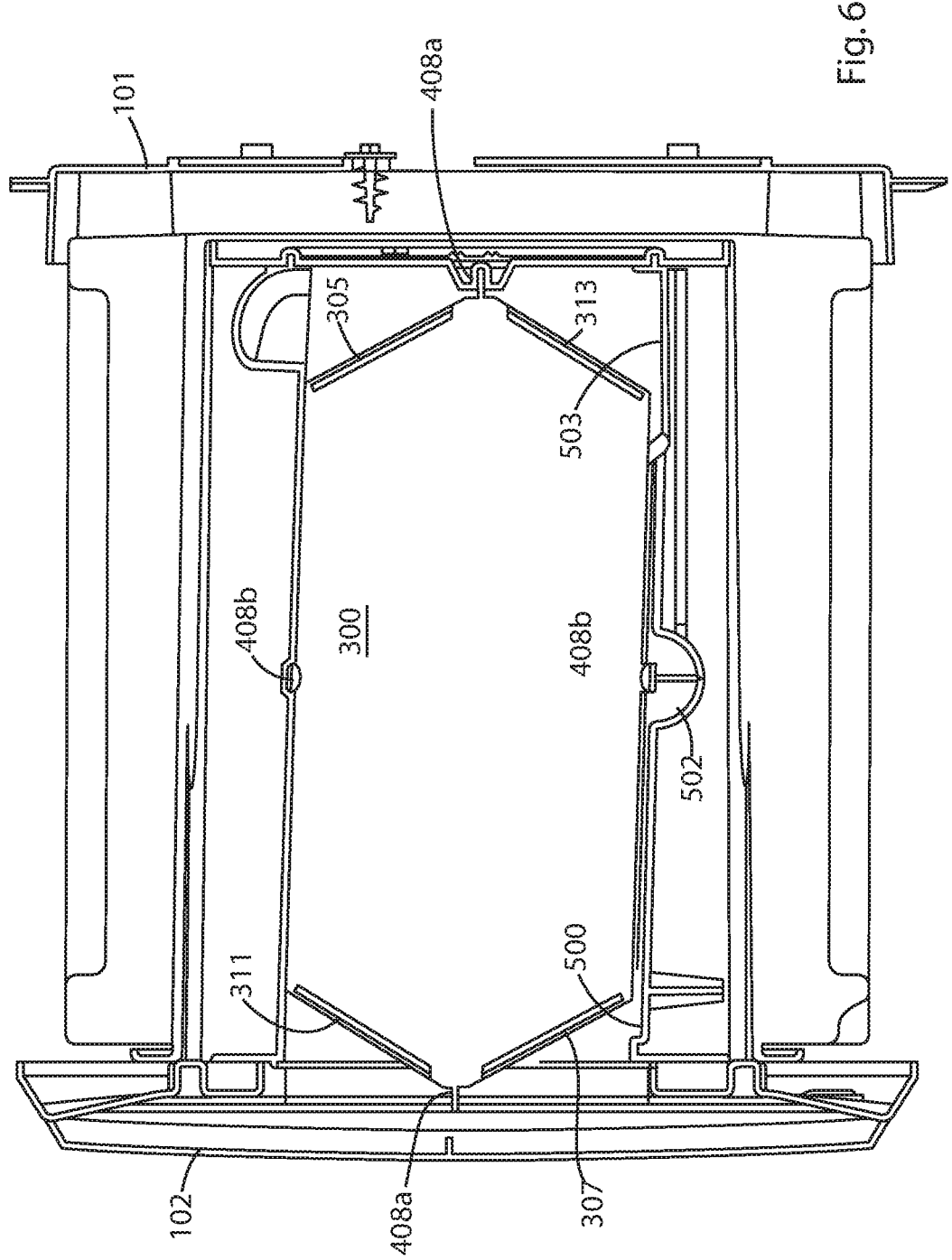
FIG. 6 is a side cross sectional view of the ventilator of FIG. 2 similar to FIG. 3 with additional elements removed.

The two opposing supply and extraction air flow streams are separated within internal cavity 317 via a plurality of partition seals 408a, 408b. That is, the supply and extraction air flow streams are separated firstly in a vertical direction by partitions 408a that extend in a substantially horizontal direction and secondly in a horizontal direction by partitions 408b that extend in a substantially vertical direction. Partitions 408a, 408b are accordingly positioned to extend between an external region of heat exchanger 300 and the corresponding internal walls 318 and trap 407. Accordingly, internal cavity 317, as illustrated in FIGS. 3 and 6, is divided into four zones in which each respective inlet and outlet heat exchanger face 305, 307, 311 and 313 is positioned. To avoid 'air leakage' in the horizontal direction between the two zones in fluid communication with trap 407 (at the lower region of cavity 317), a U-bend 502 is formed within channel 501. As channel 501 and U-bend 502 are filled with liquid condensate, an fluid seal is created that in combination with partitions 408b (that extends widthways across trap 407) act to partition the two lower zones within which heat exchanger faces 307 and 313 are located.

As will be appreciated, ventilator 100 further comprises suitable electronic component (not shown) including in particular wiring, air flow and/or temperature sensors (i.e. thermistors), moisture sensors, PCB's and wired or wireless communication components to provide electronic control of the respective motors that control and drive the first and second impellers 303, 314 and shutter flaps 401 and 403 and to relay signals from the sensors and other components. Such wired or wireless communication components are configured to interface with a suitable user control unit (such as a handheld control or software installed on a PC, tablet, phone or other electronic device as will be appreciated). The present ventilator 100 is accordingly configured to form part of a network of air conditioning and ventilation devices at a building such that the devices may be operated and controlled collectively to achieve the desired air conditioning of the building interior with respect to exhausting stale air and providing a supply of fresh air.

In a heat recovery mode that will be typically activated in a cold climate, first impeller 303 is driven to induce a supply air flow 308 into external inlet port 301 and through supply passageways 302, 304. The fresh supply air flows into heat exchanger 300 via face 305 to travel as separate streams between the internal heat exchanger fins and ducts to exit heat exchanger 300 via face 307. The fresh air supply is exhausted into the building interior as indicated by reference 309. A simultaneous counter-air flow stream is also driven through ventilator 100 and in particular heat exchanger 300 by the second impeller 314. In particular, a stale air stream 310 is induced to flow into ventilator 100 by second impeller 314 via interior inlet port 200. The stale air flow 310 passes into heat exchanger via face 311 to represent a counter flow 312 that is partitioned from the supply flow 306. Heat energy from extraction flow 312 is transferred to supply flow 306 within heat exchanger 300. Extraction flow 312 then exits heat exchanger via face 313 and is exhausted from ventilator 100 as an exhaust stream 315 via extraction passageway 316, external outlet port 400 and vent apertures 104. Condensation created at the region of face 311 (and the internal fins within heat exchange 300) falls under gravity to collect at trap 407 and in particular within trough 500. The moisture is then channelled to the well 503 via channel 501 (and U-bend 502) where it falls into the impeller 314 under gravity and/or is entrained in the extraction air flow 312 driven by impellor 314. Due to the immediate upstream position of impeller 314 relative to external outlet port 400, the liquid condensate is ejected as a vapour (or in droplet form) from the outlet port 400 due to the centrifugal force created by impeller 314 rotating about its drive shaft (not shown). According to the specific implementation, impellers 303, 314 comprise generally cylindrical bladed impellers where each impeller is formed as a plurality of rectangular fins mounted on a common support and orientated around a central axis corresponding to the drive axel which is accordingly driven by the respective impeller motors.

As will be appreciated, the ventilator 100 may also operate in supply only or extraction only modes. In the supply only mode, shutter flap 403 closes external outlet port 400 and second impeller 314 is inactivate such that the supply flow 306 is the only air flow stream passing through heat exchanger 300 from the external inlet port 301 to the internal outlet port 201. A correspond extraction only mode involves the corresponding closing of external inlet port 301 by shutter flap 401 whilst only the second impeller 314 is active (with the first impeller 303 inactive) so as to create exclusively extraction flow 312 within heat exchanger 300. When the ventilator 100 is completely inactive, both the external inlet and outlet ports 301, 400 may be closed via shutter flaps 401, 403 to partition the building interior from the external environment.

Figure 7:
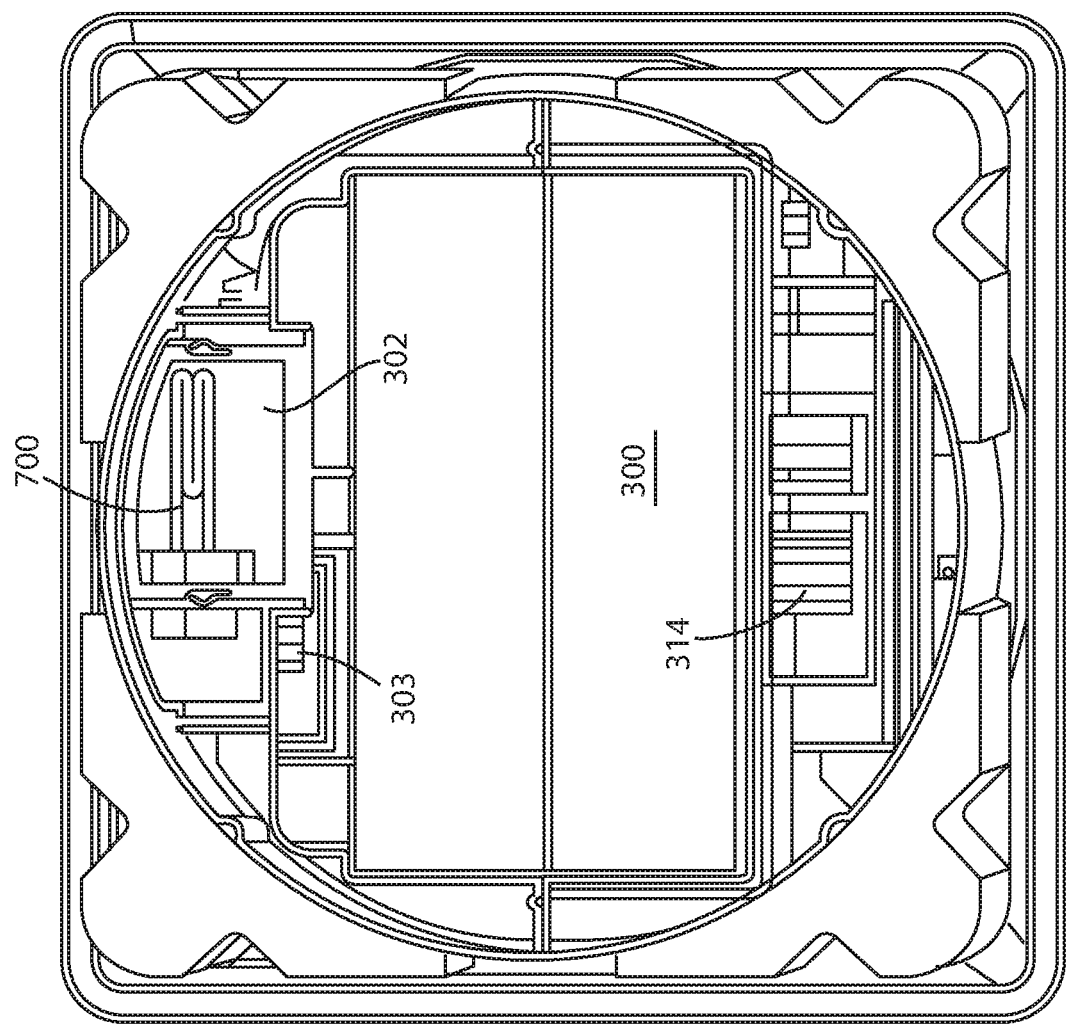
FIG. 7 is an cross sectional view of the ventilator of FIG. 2.

Referring to FIG. 7 the ventilator is also configured for use in cold environments where the supply flow may otherwise cause frosting or freezing of condensate within the ventilator interior. Accordingly, ventilator 100 comprises a heating element 700 (such as a resistance element) mounted immediately downstream of the external inlet port 301. Element 700 is coupled with a suitable PCB and electronic components for wired or wireless communications. Element 700 may be selectively activated to adjust the temperature of the supply air flow stream 308 within passageway 302 prior to reaching impeller 303. Such an arrangement is advantageous to protect impeller 303 and heat exchanger 300 from cold air. Heating element 700 is further advantageous to maximise the efficiency of the thermal energy transfer between the supply and exhaust air flow streams 306, 312 when ventilator 100 is activated in the dual flow heat recovery mode. That is, the temperature of the supply air flow into heat exchanger 300 via face 305 may be increased above the initial inlet air flow stream 308 to maximise the operating characteristics of the heat exchanger 300 for maximum heat transfer to the exhaust flow 312 and to minimise condensation formation within the ventilator 100.

It will be appreciated that although the preceding description details a building ventilator having a first and second impeller 303, 314, the objectives of the present invention may also be achieved with a building ventilator in which the first and second impellers are replaced by a single reversible fan running first one way to drive a flow of air from the external inlet port through the heat exchanger and out of the ventilator via the internal outlet port; and then reversing the other way to drive a flow of air from the internal inlet port through the heat exchanger and out of the ventilator via the external outlet port. Such a building ventilator with a single reversible fan is configured to independently drive two counter-air flow streams, including a first fresh air stream from the external side of the building and a second air flow stream form the building interior, through a single heat exchanger/recuperator mounted internally within the device.

What is claimed is:

1. A building ventilator to provide a supply of air into an interior of a building comprising:
    a housing mountable at the building;
    an external inlet port and a separate external outlet port provided at the housing to allow a stream of air to flow into and out of the ventilator respectively at an exterior of the building relative to an interior of the building;
    an internal inlet port and a separate internal outlet port provided at the housing to allow a stream of air to flow into and out of the ventilator respectively at the interior of the building;
    a heat exchanger mounted in the housing in the flow paths between the external and internal inlet and outlet ports;
    the building ventilator configured to drive a flow of air from the external inlet port through the heat exchanger and out of the ventilator via the internal outlet port and to drive a flow of air from the internal inlet port through the heat exchanger and out of the ventilator via the external outlet port;
    a heating element mounted in the air flow path between the external inlet port and the heat exchanger; and
    a condensation trap positioned adjacent the heat exchanger to collect condensation formed at the heat exchanger, the condensation trap comprising a well provided at a region of the heat exchanger in air flow communication with the external inlet and/or outlet port to guide condensation from the ventilator via the external outlet port.

2. The ventilator as claimed in claim 1 comprising:
    a first impeller to drive the flow of air from the external inlet port through the heat exchanger and out of the ventilator via the internal outlet port; and
    a second impeller to drive the flow of air from the internal inlet port through the heat exchanger and out of the ventilator via the external outlet port;
    wherein the second impeller is positioned in the air flow path between the heat exchanger and the external outlet port.

3. The ventilator as claimed in claim 2, wherein the second impeller is mounted adjacent the heat exchanger and the external outlet port.

4. The ventilator as claimed in claim 3 wherein the well is positioned to guide condensation into the second impeller and allow the condensation to be ejected from the ventilator via the external outlet port.

5. The ventilator as claimed in claim 4 wherein the condensation trap comprises a trough provided at a region of the heat exchanger in air flow communication with the internal inlet and/or outlet port to collect condensation formed at the heat exchanger, the trough configured to direct the condensation to the second impeller.

6. The ventilator as claimed in claim 5 wherein the trough is provided in fluid communication with the well via a U-bend tube.

7. The ventilator as claimed in claim 2 further comprising a first motor assembly to drive the first impeller and a second motor assembly being independent of the first motor assembly to drive the second impeller.

8. The ventilator as claimed in claim 7 wherein at least a part or parts of the second motor assembly comprise a condensation protective coating to prevent condensation impregnating the part or parts of the motor assembly.

9. The ventilator as claimed in claim 2 wherein the first impeller is mounted between the external inlet port and the heat exchanger.

10. The ventilator as claimed in claim 2 wherein the heating element is mounted in the air flow path between the external inlet port and the first impeller.

11. A building ventilator to provide a supply of air into an interior of a building comprising:
    a housing mountable at the building;
    an external inlet port and a separate external outlet port provided at the housing to allow a stream of air to flow into and out of the ventilator respectively at an exterior of the building relative to an interior of the building;
    an internal inlet port and a separate internal outlet port provided at the housing to allow a stream of air to flow into and out of the ventilator respectively at the interior of the building;
    a heat exchanger mounted in the housing in the flow paths between the external and internal inlet and outlet ports;
    the building ventilator configured to drive a flow of air from the external inlet port through the heat exchanger and out of the ventilator via the internal outlet port and to drive a flow of air from the internal inlet port through the heat exchanger and out of the ventilator via the external outlet port;
    a heating element mounted in the air flow path between the external inlet port and the heat exchanger;
    a first shutter movably mounted to open and close the external inlet port; and
    a second shutter movably mounted to open and close the external outlet port.

12. The ventilator as claimed in claim 11 further comprising a first and second shutter motor to independently actuate the respective first and second shutters.

13. The ventilator as claimed in claim 1 wherein a part of the housing comprises an outer cover removably mounted at the ventilator via at least one releasable fastening.

14. The ventilator as claimed in claim 2 further comprising a control unit having a user interface to provide electronic control of the first and second impellers.

15. The ventilator as claimed in claim 1 further comprising control communication components to provide wired or wireless communication between the ventilator and a control unit and/or a network of building ventilator devices.

16. A building ventilator to provide a supply of air into an interior of a building comprising:
- a housing mountable at the building;
- an external inlet port and a separate external outlet port provided at the housing to allow a stream of air to flow into and out of the ventilator respectively at an exterior of the building relative to an interior of the building;
- an internal inlet port and a separate internal outlet port provided at the housing to allow a stream of air to flow into and out of the ventilator respectively at the interior of the building;
- a heat exchanger mounted in the housing in the flow paths between the external and internal inlet and outlet ports;
- a first impeller to drive a flow of air from the external inlet port through the heat exchanger and out of the ventilator via the internal outlet port; and
- a second impeller to drive a flow of air from the internal inlet port through the heat exchanger and out of the ventilator via the external outlet port;
- wherein the second impeller is positioned in the air flow path between the heat exchanger and the external outlet port;
- wherein the building ventilator further comprises a condensation trap positioned adjacent the heat exchanger to collect condensation formed at the heat exchanger;
- the condensation trap comprising a well provided at a region of the heat exchanger in air flow communication with the external inlet and/or outlet port to guide condensation into the second impeller and allow the condensation to be ejected from the ventilator via the external outlet port;
- the condensation trap further comprising a trough provided at a region of the heat exchanger in air flow communication with the internal inlet and/or outlet port to collect condensation formed at the heat exchanger, the trough configured to direct the condensation to the well;
- the trough being provided in fluid communication with the well via a U-bend tube.

17. A building comprising a ventilator as claimed in claim 1.

18. A building comprising a ventilator as claimed in claim 16.

* * * * *

UNITED STATES PATENT AND TRADEMARK OFFICE
CERTIFICATE OF CORRECTION

| | | |
|---|---|---|
| PATENT NO. | : 9,746,200 B2 | Page 1 of 1 |
| APPLICATION NO. | : 15/065776 | |
| DATED | : August 29, 2017 | |
| INVENTOR(S) | : Joseph Holland and Dan Spearman | |

It is certified that error appears in the above-identified patent and that said Letters Patent is hereby corrected as shown below:

On the Title Page

Item (73)    Delete "EXPELAIR"
                          Insert -- XPELAIR --

Signed and Sealed this
Sixteenth Day of October, 2018

Andrei Iancu
*Director of the United States Patent and Trademark Office*